Nov. 19, 1968    J. ANSDELL    3,411,801
HAND TRUCK FOR UPHOLSTERED COUCHES
Filed Nov. 28, 1966    2 Sheets-Sheet 1
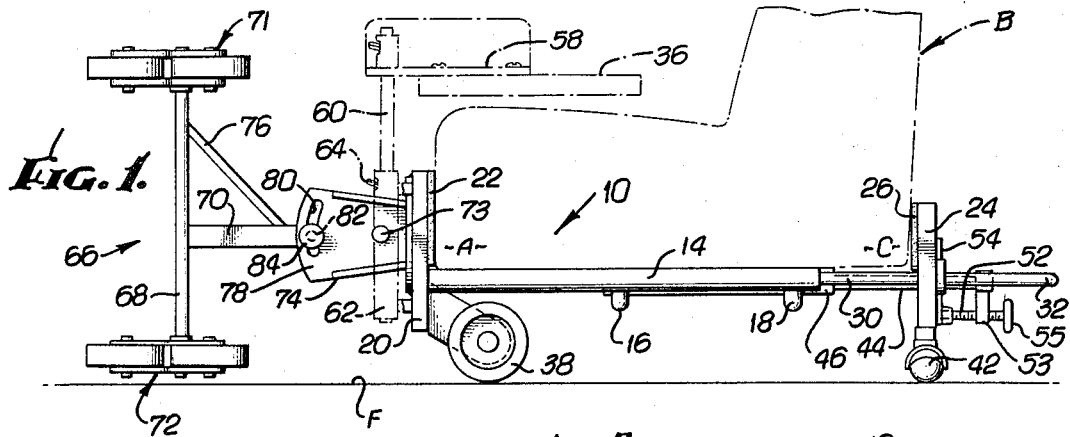
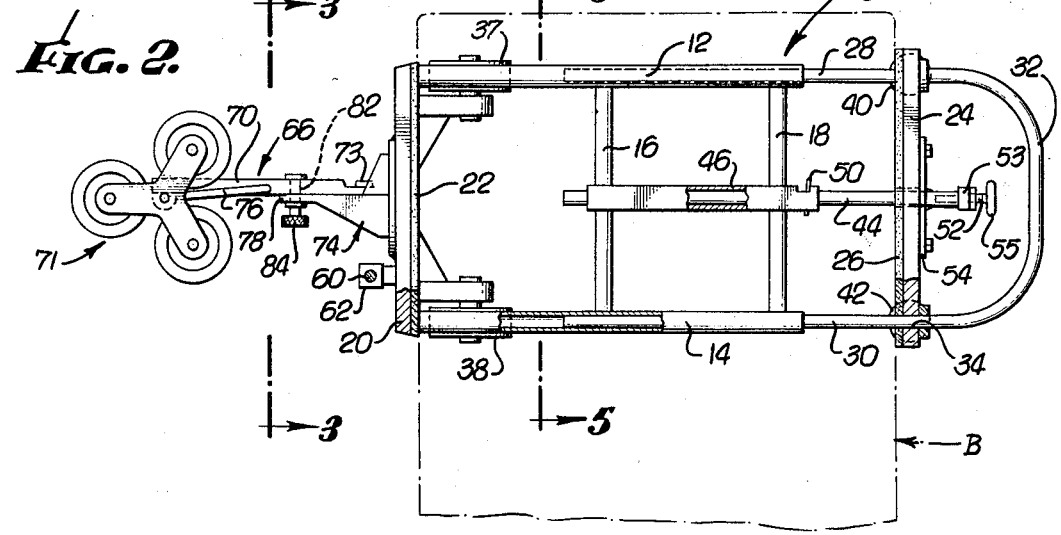
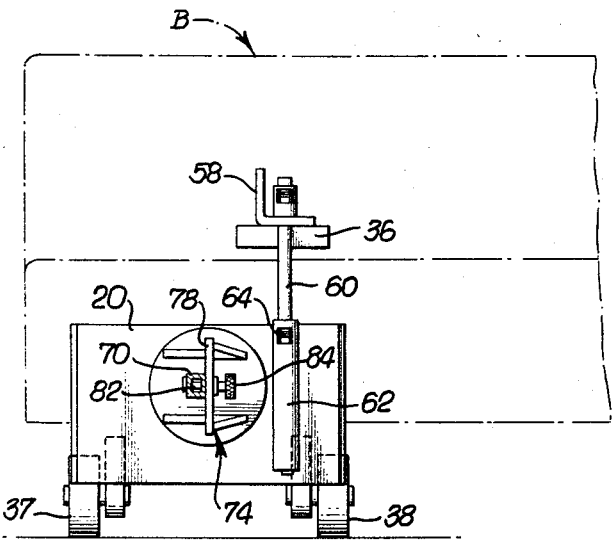
INVENTOR.
JOHN ANSDELL
By Flam and Flam
ATTORNEYS.

Nov. 19, 1968  J. ANSDELL  3,411,801
HAND TRUCK FOR UPHOLSTERED COUCHES
Filed Nov. 28, 1966  2 Sheets-Sheet 2

INVENTOR.
JOHN ANSDELL
By Flam and Flam
ATTORNEYS.

United States Patent Office 3,411,801
Patented Nov. 19, 1968

3,411,801
HAND TRUCK FOR UPHOLSTERED COUCHES
John Ansdell, c/o A&D Upholstering, 16701 Bellflower
Blvd., Bellflower, Calif. 90706
Filed Nov. 28, 1966, Ser. No. 597,328
20 Claims. (Cl. 280—47.24)

This invention relates to a hand truck especially designed for use in transporting upholstered couches.

Hand trucks have been devised whereby a single person can move a heavy refrigerator. In some instances hinges or handles may have to be removed, but in any event a doorway is no more a problem for one man than it is for two. However, in order to move an upholstered couch through a doorway slightly narrower than the width of a couch, the couch must be tilted about a longitudinal axis. Two men have been required in order to accomplish this task. This creates a substantial problem for upholstery shops, for example. Unless the shop is quite large, a two man crew for pickup and delivery would be quite uneconomical.

Accordingly the primary object of this invention is to provide a one man truck for upholstered couches designed to facilitate movement of the couch through narrow doorways and up and down stairs.

Another object of this invention is to provide a hand truck of this character that rigidly attaches to one end of a couch whereby through manipulations at the other end of the couch, the couch can be lifted to transfer the weight to the truck and whereby the couch so lifted can be effectively handled.

Another object of this invention is to provide a hand truck of this character that rigidly attaches to the couch in a simple and effective manner.

Another object of this invention is to provide a hand truck of this character that is simple in design not only for purposes of economical manufacture, but also for purposes of ease of operation.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a side elevational view of a hand truck incorporating my invention, the couch with which the hand truck cooperates being shown in phantom lines;

FIG. 2 is a top plan view of the hand truck shown in FIG. 1;

FIG. 3 is a sectional view taken along the plane corresponding to line 3—3 of FIG. 2;

Figure 4:
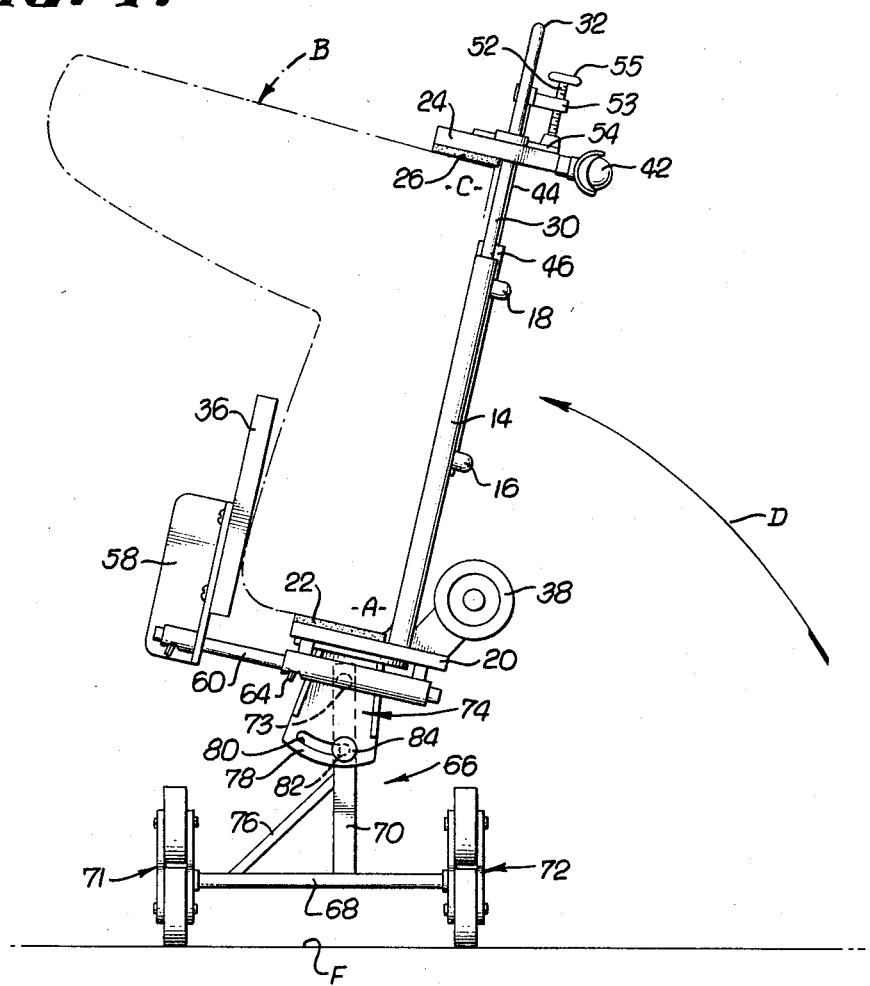
FIG. 4 is a side elevational view similar to FIG. 1 but showing the truck in an adjusted angular position and the couch lifted into a position for manipulation.

The hand truck 10 (FIG. 1) provides a bed upon which the bottom of the couch may rest. The bed is formed by two spaced, parallel tubular frame members 12 and 14 (FIG. 2) and two struts or braces 16 and 18 extending between and rigidly joined to the frame members. The frame members define a bed plane upon which a couch may rest. A foot plate 20 extends across one end of the bed and is attached to the ends of the frame members 12 and 14. The foot plate 20 extends upwardly and forms with the bed an elongated angle or seat for receiving the frontal corner A of the couch B. A protective pad 22 is adhered to the foot plate 20.

In order rigidly to attach the bed to the hand truck, two clamp structures are provided. One clamp structure secures the couch against the foot plate 20 and the other clamp holds the couch against the bed.

One of the clamps comprises a pressure plate 24 designed to engage at the rear corner C of the couch (FIG. 1). The plate 24 forms with the frame and foot plate 20, a channel in which the couch may be clamped. The pressure plate 24 carries a protective pad 26. The plate 24 is slidably mounted upon the bed for movement toward and away from the corner C. For this purpose, the pressure plate 24 carries two posts 28 and 30 respectively guidingly received in the tubular frame members 12 and 14. The posts 28 and 30 in this instance are conveniently formed at the ends of a single U-shaped handle rod 32, the central connecting portion of the rod extending rearwardly of the pressure plate 24. The rod 32 extends through and is secured at apertures 34 of the plate.

Figure 5:
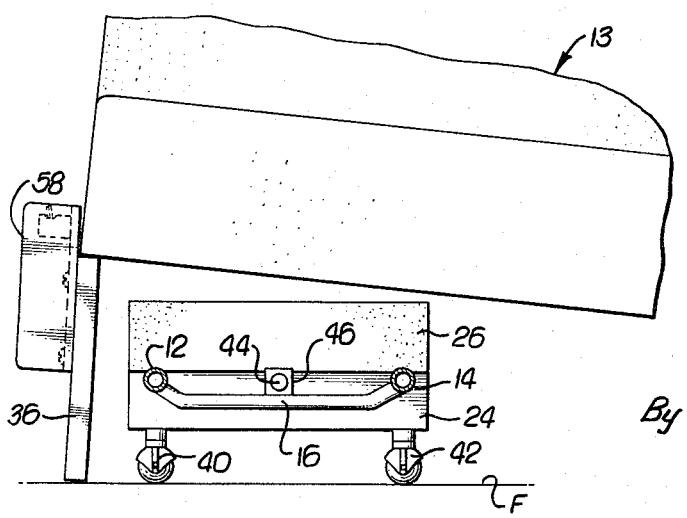
FIG. 5 is an elevational view of the couch braced for positioning the hand truck, the hand truck being shown in section, the section plane being indicated by line 5—5 of FIG. 2.

Wheels 37 and 38 are mounted on the foot plate 22, and casters 40 and 42 are mounted on the pressure plate 24. Accordingly the bed formed by the frame is supported. In order to position the bed beneath the couch, the end of the couch is first lifted and held in that position by a strut 36 (FIG. 5). In practice the strut 36 forms a part of the second clamp. The carriage may then be wheeled beneath the couch.

Before the couch is lowered, the pressure plate is moved outwardly to ensure adequate clearance. The couch is then lowered and appropriately cornered at the foot plate 22. Then pressure plate 24 is wheeled forwardly. Movement of the pressure plate 24 in this direction is unopposed. However, the pressure plate 24 is normally restrained from rearward or retracting movement. For this purpose a releasably slip-lock or one-way clutch coupling is provided. This coupling serves to maintain the force that may be manually exerted as the pressure plate contacts the couch corner C.

The one-way clutch includes a movable rod 44 that passes with clearance through a hole in the pressure plate 24. This rod is slidably accommodated in an open ended tubular member 46 attached to and extending transversely of the cross braces 16 and 18. A binding ring 50 provides an aperture through which the rod 44 extends. When the ring 50 is moved to a perpendicular relationship with respect to the rod, there is adequate clearance; however, when the ring 50 is moved to an oblique relationship, it binds up and locks the rod against movement in the direction corresponding to increased obliquity. The ring 50 is mounted by the tubular member 46 for movement from a perpendicular position to an oblique position. A spring (not shown) urges the upper end of the ring outwardly to bind on the rod and prevent the rod from moving outwardly. Inward movement of the rod 44 opposes the force of the spring and releases the binding ring 50. A wide variety of other sliplock connections could be provided.

A clamp screw 52 limits outward movement of the pressure plate 24. The screw is threadedly mounted by a bracket arm 53 attached to the end of the rod. The end of the screw engages a bearing plate 54 attached to the pressure plate 24. A handle 55 for the screw first serves to advance the pressure plate against the couch and to cause the rod 44 to slip forwardly. The handle then serves to rotate the screw to develop increased clamping pressure between the plate 24 and the couch corner C.

In order to release the couch after it has been moved, the screw 52 is simply backed off until sufficient clearance is provided. Before the hand truck is used again, the binding ring 50 is released so as to provide ample clearance.

The other clamp includes the struct 36 (FIG. 1) which serves as a pressure plate engageable with the frontal portion of the seat. The plate 36 is attached to a bracket 58. This bracket has a slip-lock connection with a post 60 to allow its separation for use as a strut (FIG. 5). The post 60 extends vertically in front of the couch and is slidably accommodated in a tubular guide 62 mounted on the outer side of the foot plate 20. A one-way slip-lock connection is also provided between the post 60 and the guide 62 by the aid of a binding ring 64. Both slip-lock connections on the post 60 are similar to each other and to the slip-lock connection heretofore described. The binding ring 64 has a movable end spring urged in an upward direction to lock the post 60 from upward movement. The slip-lock connection between the plate 36 and the post 60 is so arranged that a downward pressure on the plate 36 relative to the post 60 is resisted; however downward movement of the post 60 is not opposed by the binding ring 64 and it accordingly slips. The parts so move in opposition to the resilience of the cushions or springs of the couch. Downward thrust on the plate 36 produced by manual pressure is thus sustained by the binding ring 64. The binding ring 64 is readily released by moving it downwardly, as for example by the application of pedal pressure.

In order to support the couch B in a rotated position for clearing the door narrower than the width of the couch, a wheel assembly 66 is provided. This assembly is located forwardly of the foot plate 20 and outside of the angle in which the couch corner A is received. The wheel assembly includes an axle 68 and wheel brackets 71 and 72 at opposite ends. A pivot bar 70 attached at one end to the axle is pivotally connected at its other end to the foot plate 20 for movement about an axis parallel to the length of the couch. A pin 73 (FIGS. 2 and 3) connects the bar 70 to a large bearing bracket 74 attached to the foot plate 20. A brace 76 is provided between the axle 68 of the pivot bar 70.

The angular relationship between the wheel assembly and the foot plate is adjusted when the couch is supported by wheels 37, 38 and casters 40 and 42 in order to determine the angular position of the couch when the wheel assembly 66 supports the couch as shown by the arrow D in FIG. 4.

The bracket 74 includes a segment 78 (FIGS. 1 and 4) providing an arcuate slot 80 that receives a stud 82 attached to the pivot bar 70. A nut 84 mounted on the stud may be moved to grip or interlock the slot 80 thus to hold the parts in a selected angularly adjusted position.

To transfer the load of the couch to the wheel assembly 66, the handle rod 32 is lifted, the wheels at one end of the assembly 66 contact the floor, and finally the wheels at the other end contact the floor. The remote end of the couch simply pivots on the floor F. After the couch is so positioned (FIG. 4) the angularly may be readjusted if necessary. Thereafter the remote end of the couch is lifted and the couch is readily maneuvered.

If desired, a wheeled rest may be provided for the remote end of the couch. Such rest may be detachably connected to the wheel assembly 66 by a strut telescopically cooperable with a post projecting from the pivot bar 70.

The inventor claims:

1. In a hand truck for use in moving upholstered couches or the like: a frame forming a bed plane; a foot plate at one end of the frame defining a solid angle with said bed said angle having an apex; releasable clamp means for securing an object, such as a couch, to said angle; and a wheel assembly connected to said frame and located outside the said angle; said wheel assembly having a rolling axis confined to extend in a plane that is substantially perpendicular to the said apex.

2. The hand truck as set forth in claim 1 in which said wheel assembly is located beyond the foot plate end of said frame.

3. The combination as set forth in claim 1 in which said wheel assembly includes an axle and wheels mounted at the ends of said axle, said axle being located beyond the foot plate end of said frame with said axle extending substantially perpendicular to the plane of said bed.

4. The combination as set forth in claim 3 together with means for adjustably determining the angularity of said wheel assembly axis in its said plane.

5. In a hand truck for use in moving upholstered couches or the like: a frame forming a bed for the bottom of the couch; a foot plate attached to the frame; a clamping plate; means mounting the clamping plate for movement toward and away from the foot plate and forming with the foot plate and said frame, a channel in which a couch may be received, said clamp plate being movable toward said foot plate for clamping the couch to the bed; releasable clamping means maintaining a clamping pressure of said clamping plate toward said foot plate; and a wheel assembly connected to said frame and located beyond said channel; said wheel assembly having a rolling axis extending in a plane that is substantially perpendicular to the longitudinal direction of said channel.

6. The combination as set forth in claim 5 in which said clamping means includes a slip rod, extending substantially parallel to said bed, a releasable slip-lock connection between said slip rod and said bed, a clamping plate connected to said slip rod, and a screw threaded member mounted on said slip rod for exerting a clamping pressure on said clamping plate.

7. The combination as set forth in claim 6 together with a said clamping means includes a second slip rod extending substantially perpendicular to said bed, a releasable slip-lock connection between said slip rod and said bed, and a clamping plate connected to said second slip rod.

8. The combination as set forth in claim 5, together with means for adjustably determining the angularity of said wheel assembly axis relative to said frame about an axis extending substantially parallel to the length of said channel.

9. The combination as set forth in claim 4 in which said angularity determining means includes a segment carried by the frame and having an arcuate slot, a stud carried by said wheel assembly movable along said slot, and a nut carried by the stud for engagement with the segment along the edge of the slot.

10. The combination as set forth in claim 2 together with a wheeled rest secured to the wheel assembly and displaced from said wheeled rest in a direction along the length of said angle.

11. The combination as set forth in claim 10 in which said wheeled rest is detachably secured to said wheel assembly.

12. The combination as set forth in claim 6 together with means for adjustably determining the angularity of said wheel assembly axis relative to said frame about an axis extending substantially parallel to the length of said channel.

13. The combination as set forth in claim 7 together with means for adjustably determining the angularity of said wheel assembly axis relative to said frame about an axis extending substantially parallel to the length of said channel.

14. The combination as set forth in claim 8 in which said angularity determining means includes a segment carried by the frame and having an arcuate slot, a stud carried by said wheel assembly movable along said slot, and a nut carried by the stud for engagement with the segment along the edge of the slot.

15. The combination as set forth in claim 12 in which said angularity determining means includes a segment carried by the frame and having an arcuate slot, a stud carried by said wheel assembly movable along said slot, and a nut carried by the stud for engagement with the segment along the edge of the slot.

16. The combination as set forth in claim 13 in which said angularity determining means includes a segment carried by the frame and having an arcuate slot, a stud carried by said wheel assembly movable along said slot, and a nut carried by the stud for engagement with the segment along the edge of the slot.

17. The combination as set forth in claim 2 together with wheels carried by said frame beneath said bed plane and supporting said bed plane in a horizontal position with said wheel assembly above the plane of contact of said wheels whereby said frame may be moved beneath one end of said couch.

18. The combination as set forth in claim 4 together with wheels carried by said frame beneath said bed plane and supporting said bed plane in a horizontal position with said wheel assembly above the plane of contact of said wheels whereby said frame may be moved beneath one end of said couch.

19. The combination as set forth in claim 5 together with wheels carried by said frame beneath said bed plane and supporting said bed plane in a horizontal position with said wheel assembly above the plane of contact of said wheels whereby said frame may be moved beneath one end of said couch.

20. The combination as set forth in claim 8 together with wheels carried by said frame beneath said bed plane and supporting said bed plane in a horizontal position with said wheel assembly above the plane of contact of said wheels whereby said frame may be moved beneath one end of said couch.

References Cited

UNITED STATES PATENTS

| | | | |
|---|---|---|---|
| 1,927,710 | 8/1933 | Linsay | 280—8 |
| 2,736,569 | 2/1956 | Davis | 280—47.24 |
| 3,215,447 | 11/1965 | McCarty | 280—35 |

BENJAMIN HERSH, *Primary Examiner.*

L. D. MORRIS, JR., *Assistant Examiner.*